(12) United States Patent
Hickey et al.

(10) Patent No.: US 7,514,166 B2
(45) Date of Patent: Apr. 7, 2009

(54) REDUCTION OF SOFC ANODES TO EXTEND STACK LIFETIME

(75) Inventors: Darren Hickey, Palo Alto, CA (US); Chockkalingam Karuppaiah, Cupertino, CA (US); James McElroy, Suffield, CT (US)

(73) Assignee: Bloom Energy Corporation, Sunnyvale, CA (US)

( * ) Notice: Subject to any disclaimer, the term of this patent is extended or adjusted under 35 U.S.C. 154(b) by 811 days.

(21) Appl. No.: 11/095,552

(22) Filed: Apr. 1, 2005

(65) Prior Publication Data

US 2006/0222929 A1    Oct. 5, 2006

(51) Int. Cl.
*H01M 8/10* (2006.01)

(52) U.S. Cl. .................. 429/13; 429/23; 429/30

(58) Field of Classification Search .......... None
See application file for complete search history.

(56) References Cited

U.S. PATENT DOCUMENTS

| | | | |
|---|---|---|---|
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,498,487 A | 3/1996 | Ruka et al. | |
| 5,527,631 A | 6/1996 | Singh et al. | |
| 5,573,867 A | 11/1996 | Zafred et al. | |
| 5,601,937 A | 2/1997 | Isenberg | |
| 5,733,675 A | 3/1998 | Dederer et al. | |
| 5,741,605 A | 4/1998 | Gillett et al. | |
| 6,013,385 A | 1/2000 | DuBose | |
| 6,051,125 A | 4/2000 | Pham et al. | |
| 6,051,329 A * | 4/2000 | Fasano et al. | .......... 429/30 |
| 6,280,865 B1 | 8/2001 | Eisman et al. | |
| 6,329,090 B1 | 12/2001 | McElroy et al. | |
| 6,403,245 B1 | 6/2002 | Hunt | |
| 6,436,562 B1 | 8/2002 | DuBose | |
| 6,677,070 B2 | 1/2004 | Kearl | |
| 6,854,688 B2 | 2/2005 | McElroy et al. | |
| 2002/0058175 A1 | 5/2002 | Ruhl | |

(Continued)

OTHER PUBLICATIONS

Cell and Stack Construction: Low-Temperature Cells, L.G. Austin, NASA SP-120, 1967.

(Continued)

*Primary Examiner*—Patrick Ryan
*Assistant Examiner*—Cynthia Lee
(74) *Attorney, Agent, or Firm*—Foley & Lardner LLP

(57) ABSTRACT

One embodiment of the invention provides a method of operating a solid oxide fuel cell, including providing a solid oxide fuel cell comprising an anode electrode containing nickel, and electrochemically reducing an anode side of the fuel cell. Another embodiment of the invention provides a method of operating a solid oxide fuel cell, including providing a solid oxide fuel cell comprising an anode electrode containing nickel, periodically operating the fuel cell to generate electricity, and reducing an anode side of the fuel cell between electricity generation operation periods of the fuel cell.

34 Claims, 3 Drawing Sheets

U.S. PATENT DOCUMENTS

2005/0053812 A1 3/2005 Hickey et al.
2005/0106427 A1* 5/2005 Murray et al. ............... 429/13
2005/0164051 A1 7/2005 Venkataraman et al.

OTHER PUBLICATIONS

Low Cost, High Efficiency Reversible Fuel Cell Systems, Proceedings of the 2002 U.S. DOE Hydrogen Program Review, NREL/CP-610-32405.

Low Cost Reversible Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program.

Small, Ultra Efficient Fuel Cell Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP-570-30535.

Regenerative Fuel Cells for High Altitude Long Endurance Solar Powered Aircraft, F. Mitlitsky, et al, 28$^{th}$ Intersociety Energy Conversion Engineering Conference (IECEC), Jul. 28, 1993, UCRL-JC-113485.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.

Power Generation and Steam Electrolysis Characteristics of an Electrochemical Cell with a Zirconia- or Ceria-based Electrode, K. Eguchi, et al, Solid State Ionics, 86 88 (1996) 1245-1249.

U.S. Appl. No. 10/822,707, filed Apr. 13, 2004, Dien Nguyen et al.

* cited by examiner

REDUCTION OF SOFC ANODES TO EXTEND STACK LIFETIME

BACKGROUND OF THE INVENTION

The present invention is generally directed to fuel cells and more specifically to solid oxide fuel cells and their operation.

Fuel cells are electrochemical devices which can convert energy stored in fuels to electrical energy with high efficiencies. A solid oxide fuel cell (SOFC) generates electrical energy and reactant product from fuel and oxidizer. The SOFC contains a ceramic electrolyte, a negative or fuel electrode and a positive or oxygen electrode. The electrolyte is usually a doped zirconia ceramic. The negative or fuel electrode (referred hereto as the "anode" electrode) may be made from a cermet, such as a nickel-yttria stabilized zirconia ("YSZ") cermet. The positive or oxygen electrode (referred hereto as the "cathode" electrode) is usually made of a ceramic perovskite material, such as lanthanum strontium manganite ("LSM") having a formula $(La,Sr)MnO_3$ or lanthanum strontium cobaltite ("LSCo") having a formula $(La,Sr)CoO_3$. Furthermore, contact layers, such as a Ni or nickel oxide anode contact layer and an LSM or LSCo cathode contact layer may be formed on the anode and cathode electrodes, respectively. The SOFC is usually part of a system which includes a plurality of electrically connected fuel cells and other components, such as gas separator/interconnect plates, seals and electrical contacts. Each gas separator/interconnect plate contacts the electrode and/or current collector layer of adjacent fuel cells. One draw back of SOFCs is their degradation over time.

SUMMARY

One aspect of the invention provides a method of operating a solid oxide fuel cell, comprising providing a solid oxide fuel cell comprising an anode electrode containing nickel, and electrochemically reducing the anode side of the fuel cell.

Another aspect of the invention provides a method of operating a solid oxide fuel cell, comprising providing a solid oxide fuel cell comprising an anode electrode containing nickel, periodically operating the fuel cell to generate electricity, and reducing the anode side of the fuel cell between electricity generation operation periods of the fuel cell.

DETAILED DESCRIPTION OF THE PREFERRED EMBODIMENTS

In a first embodiment of the invention, the performance of a fuel cell may be improved by performing an electrochemical reduction of the anode electrode prior to operation of the fuel cell in the electricity generation mode. The nickel in the anode electrode cermet prior to operation of the fuel cell may be present in the form of nickel oxide. During the electrochemical reduction treatment, the nickel oxide is reduced to nickel. In other words, at least a portion of the nickel in the anode electrode is in a form of nickel oxide, and at least a portion of the nickel oxide is reduced to nickel during the reduction treatment. The electrochemical reduction includes applying an external voltage to each fuel cell in the stack in a reverse current direction, and creating a strong reducing environment on the anode side of the fuel cells.

In a second embodiment of the invention, the anode degradation may be reduced or even reversed by periodic reduction treatment of the anode side of the fuel cell (i.e., the side of the fuel cell containing the anode electrode and anode contact layer). The reduction treatment may comprise any suitable anode reduction treatment, such as periodically idling the stack in a hydrogen containing gas, such as dry hydrogen, provided to the anode side (i.e., a chemical reduction), or by periodically electrochemically reducing the anode side. The electrochemical reduction is advantageous over the chemical reduction because it is shorter in duration. Also in the case of electrochemical reduction, the current profile recorded will aid one in determining the end of electrochemical reduction. The periodic anode reduction techniques may be able to reduce or even reverse the anode degradation and be applied at periodic maintenance intervals to extend stack useful life.

Figure 1:
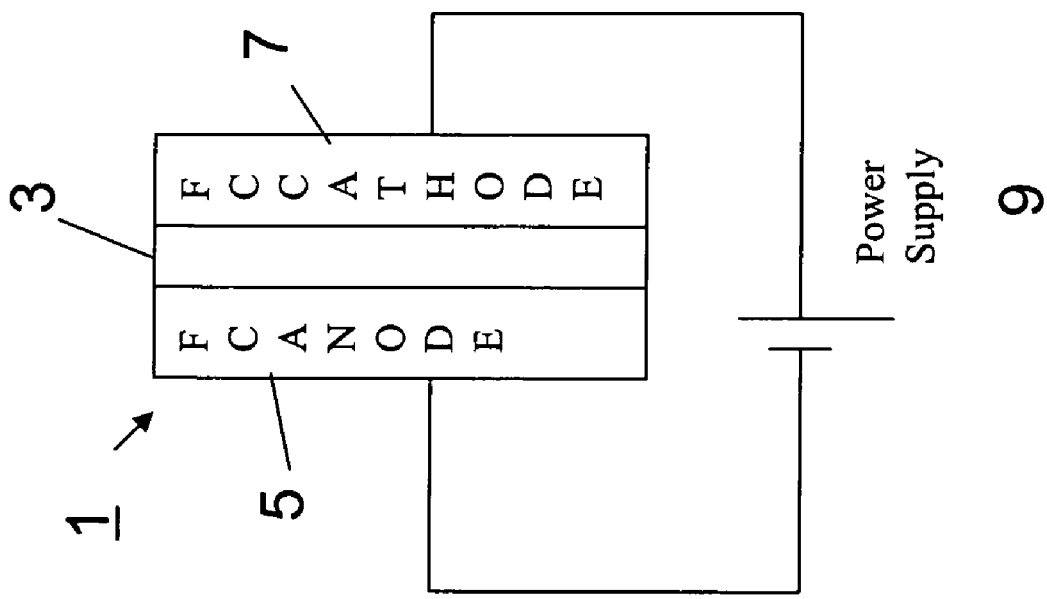
FIG. 1 is a schematic of a fuel cell undergoing an electrochemical reduction treatment.

FIG. 1 illustrates an exemplary solid oxide fuel cell 1 undergoing an electrochemical reduction treatment. The fuel cell preferably comprises a non-reversible solid oxide fuel cell. In other words, the fuel cell is not constructed or adapted to normally operate in the electrolysis mode to generate additional fuel. However, a reversible solid oxide fuel cell may also be used if desired. The fuel cell 1 contains an electrolyte 3, an anode electrode 5 and a cathode electrode 7. For example, as noted above, the electrolyte 3 may comprise an ionically conductive ceramic, such as a doped zirconia and/or another suitable ceramic oxide material, for example stabilized or unstabilized zirconia(s), such as YSZ or scandia stabilized zirconia ("SSZ") or blends thereof. The anode 5 may comprise a Ni containing cermet, which contains Ni and one or more ceramic materials, and the cathode 7 may comprise an electrically conductive ceramic, such as LSM or LSCo. The anode cermet may comprise any suitable ceramic materials, such as ceria and/or doped zirconia. For example, the anode cermet preferably comprises nickel, doped ceria and doped zirconia, including but not limited to gadolinia doped ceria ("GDC") and YSZ. Other stabilized zirconias, such as scandia stabilized zirconia or ceria stabilized zirconia may also be used in addition to or instead of YSZ. Furthermore, if desired, additional contact or current collector layers may be placed over the anode and cathode electrodes while additional interfacial layers, such as doped ceria interfacial layers, may be located between the electrodes and the electrolyte. For example, a Ni or nickel oxide anode contact layer and an LSM or LSCo cathode contact layer may be formed on the anode and cathode electrodes, respectively.

It should be noted that the solid oxide fuel cell 1 illustrated in FIG. 1 is preferably used in a fuel cell stack which includes a plurality of electrically connected fuel cells and other components, such as gas separator/interconnect plates, seals and electrical contacts. The gas separator/interconnect plates may comprise any suitable gas impermeable and electrically conductive material, such as a metal or metal alloy (for example a proprietary specialty chromium alloy available from Plansee AG), an electrically conductive ceramic or an electrically insulating ceramic with electrically conductive fillers, which are described in U.S. patent application Ser. No. 10/822,707, filed Apr. 13, 2004, incorporated herein by reference in its entirety. Each gas separator/interconnect plate contacts the electrode and/or current collector layer of adjacent fuel cells. The fuel cell stack is preferably part of a larger fuel cell system which contains one or more fuel cell stacks and balance of plant components.

FIG. 1 also shows that the load leads from the power supply 9 are reversed in the reduction process, such that the positive lead is connected to the cathode 7 and the negative lead is connected to the anode 5. Any suitable power supply 9 may be used, such as a large battery, a battery array and/or a power supply which is connected to a power grid. Thus, during the reduction process, a voltage is applied to the fuel cell and the fuel cell operates in a mode similar to a solid oxide reversible fuel cell's electrolysis mode.

During the reduction process, the fuel cell may be operated at its normal designed operating temperature, such as 800 to 900° C. An oxygen containing gas, such as air, is preferably provided on the fuel cell cathode side. A gas containing water, such as a humidified carrier gas, is preferably provided on the fuel cell anode side. Examples of humidified carrier gas include nitrogen, hydrogen or argon which contain water vapor, such as nitrogen containing 90-97% nitrogen and 3-10% water vapor. Without wishing to be bound by a particular theory, the present inventors believe that during the electrochemical reduction, oxygen from the metal oxide (such as NiO) present in the anode electrode cermet is pumped from the fuel cell anode side to the fuel cell cathode side through the electrolyte to reduce the metal oxide to a metal (i.e., to reduce the nickel oxide to nickel). The humidified gas provided to the anode side of the fuel cell is believed to completely or at least partially protect the doped zirconia, such as YSZ, present in the anode electrode cermet from being reduced. In other words, it is believed that the water in the carrier gas on the anode side is reduced preferentially compared to the doped zirconia in the anode cermet, thus protecting the doped zirconia from being reduced.

Table 1 below provides exemplary flow rates and the operating conditions for the fuel cell during an electrochemical reduction.

TABLE 1

| Operating temperature | 850° C. |
| Humidified nitrogen (96% $N_2$; 4% $H_2O$) flow on anode side | 200 sccm |
| Air flow on cathode side | 200 sccm |
| Water temperature on the anode side | 29° C. |

The exemplary reduction process of Table 1 is done under constant voltage mode. A constant voltage of 0.9 V is applied and the current is recorded. The current is about zero (slightly negative by few mA) at the start and then the peak current is 200 mA. The reduction is conducted for 45 minutes. It should be noted that other suitable voltages, gas flow rates, gas compositions and process durations may also be used in the electrochemical reduction process.

In the first embodiment of the invention, the anode electrode is subjected to an initial electrochemical reduction. In other words, the electrochemical reduction is conducted prior to normal or commercial operation of the fuel cell in the fuel cell stack to generate electricity from fuel and oxidizer. In this method, an electrolysis potential is applied across the cell when the anode is in its initial oxidized state (i.e., the nickel is initially in the form of nickel oxide) in order to rapidly and preferably completely reduce the initial nickel oxide to nickel. For a commercial size fuel cell stack, a large power supply, such as a large battery, a battery array or a power supply attached to the external grid may be provided.

Figure 2:
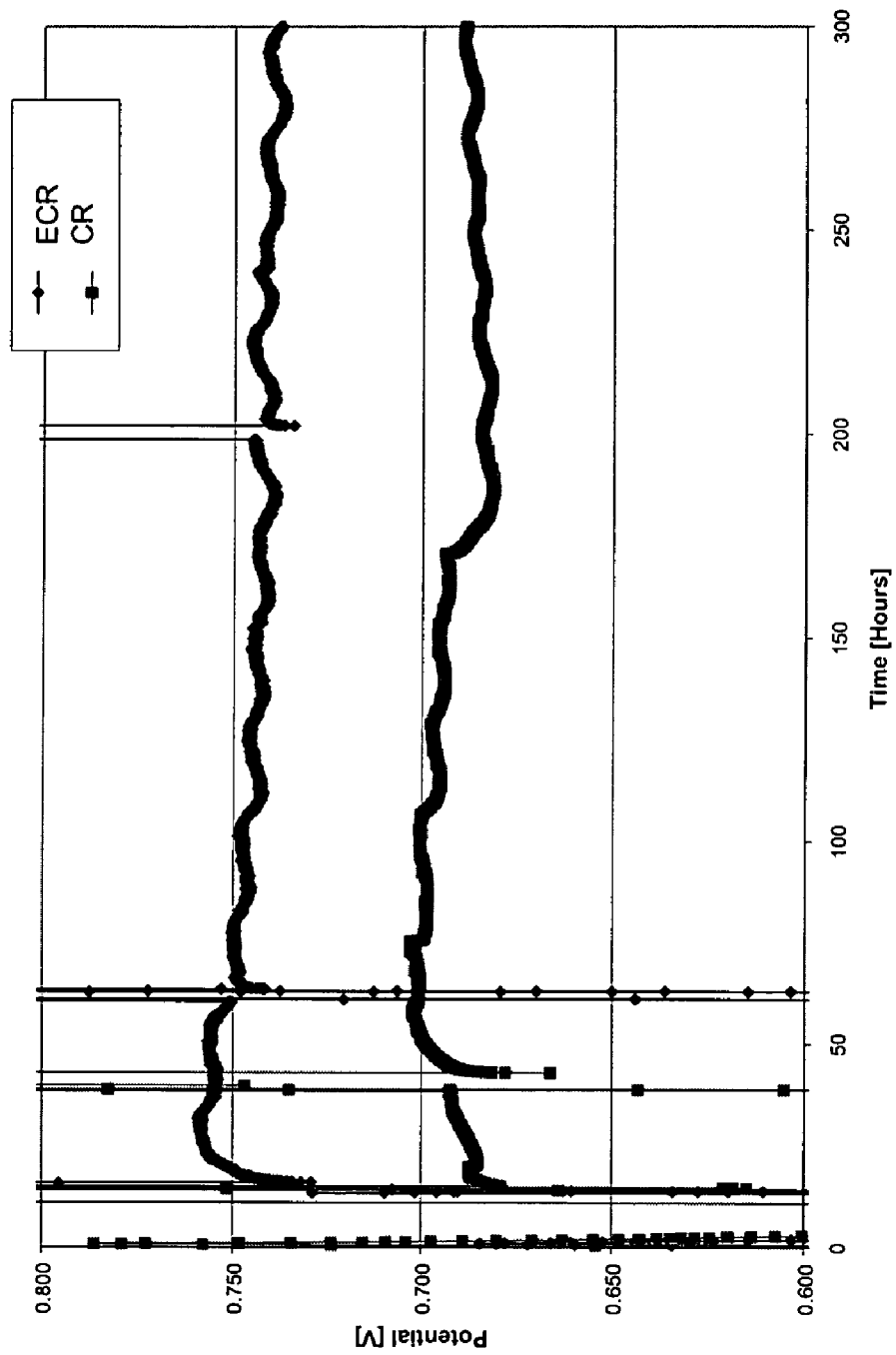
FIGS. 2 and 3 are plots of potential versus time for fuel cells operating according to examples of the first and the second respective embodiments of the invention.

FIG. 2 illustrates results from illustrative examples of the first embodiment of the invention. FIG. 2 is a plot of potential (i.e., voltage) versus operating time for two identical 50 mm single, non-reversible solid oxide fuel cells which contain an anode comprising a cermet containing nickel, GDC and YSZ. The first cell is electrochemically reduced for 45 minutes using the above described electrochemical reduction method prior to its operation to generate electricity according to an example of the first embodiment. The second cell is reduced with dry hydrogen for two hours prior to its operation without applying a potential to the cell (i.e., the cell is idled in an open circuit configuration) according to a comparative example. As can seen in FIG. 2, the performance of the cell according to the example of the first embodiment (upper line marked "ECR" for electrochemical reduction) is improved compared to the performance of the cell according to the comparative example (lower line marked "CR" for chemical reduction) over 300 hours of operation of both cells.

In a second embodiment of the invention, the reduction treatment of the anode side of the fuel cell is conducted between the electricity generation operation of the fuel cell. In other words, the reduction treatment is conducted one or more times between periods of the electricity generating operation of the fuel cell.

In a first aspect of the second embodiment, the reduction treatment is conducted a plurality of times at predetermined periodic intervals. Preferably, the periodic intervals comprise regular periodic intervals. The periodic intervals may be predetermined before the operation of the fuel cell or after the operation of the fuel cell commences. The periodic intervals may be selected based on any one or more desired factors, such as a calculation of when the voltage generated by the fuel cell stack containing the solid oxide fuel cell drops below a first predetermined desired voltage or when the fuel cell stack degradation rate reaches a second predetermined value. Thus, the periodic intervals may be calculated based on an estimate of when the fuel cell stack voltage will drop below a desired value due to anode degradation and/or when the fuel cell anode degradation will reach an unacceptably high value. Other suitable criteria may also be used to select the timing of the reduction treatments.

In a second aspect of the second embodiment, the reduction treatment is applied on an as needed basis. In this aspect, an operating parameter of the fuel cell stack is detected (i.e., monitored). When the operating parameter reaches a trigger value, the reduction treatment is applied. The reduction treatment may be applied one or more times on the as needed basis.

For example, the operating parameter being detected may be a voltage generated by the fuel cell stack or the amount of degradation being experienced by the stack. Thus, when the voltage generated by the stack drops below a predetermined voltage and/or when the fuel cell degradation rate reaches a predetermined value, the reduction treatment is applied to the stack.

The detection of the operating parameter may be conducted automatically, such as by a computer or other logic circuit, or manually by the fuel cell stack system operator. Likewise, the initiation of the reduction treatment in the first or second aspects of the second embodiment may be initiated automatically or manually. Thus, if the detection is conducted automatically but the reduction initiation is conducted manually, then the computer or other logic circuit may provide a visual or audio message (such as an alarm or a display symbol or writing) to the system operator to manually initiate the reduction treatment.

It should be noted that the first and second aspects of the second embodiment may be combined such that the reduction treatment is applied both in periodic intervals as well as on the as needed basis. The reduction treatment in the first and second aspects of the second embodiment may be conducted electrochemically and/or chemically. In other words, an electrochemical or a chemical treatment may be initiated during the periodic intervals or when it is determined that the stack requires a reduction treatment.

Any suitable chemical reduction treatment may be used in the second embodiment. For example, hydrogen gas, such as dry hydrogen gas, or a hydrogen containing gas, such as dry forming gas (i.e., a mixture of hydrogen and nitrogen) may be provided to the anode side of the fuel cell, while the fuel cell is idled (i.e., no current or voltage is applied to the cell). Preferably, a dry gas (i.e., a gas which contains no water) is provided to the anode side. For example, 200 sccm of dry hydrogen may be provided to the anode electrode and 300 sccm air may be provided to the cathode electrode of the cell, while the cell is maintained at about 800 to about 900° C., such as 850° C., for example. The chemical reduction treatment may be conducted for any suitable amount of time. Generally, the chemical reduction will take a longer time to complete than a comparable electrochemical reduction, but it does not need a high current power supply, as does the electrochemical reduction.

Figure 3:
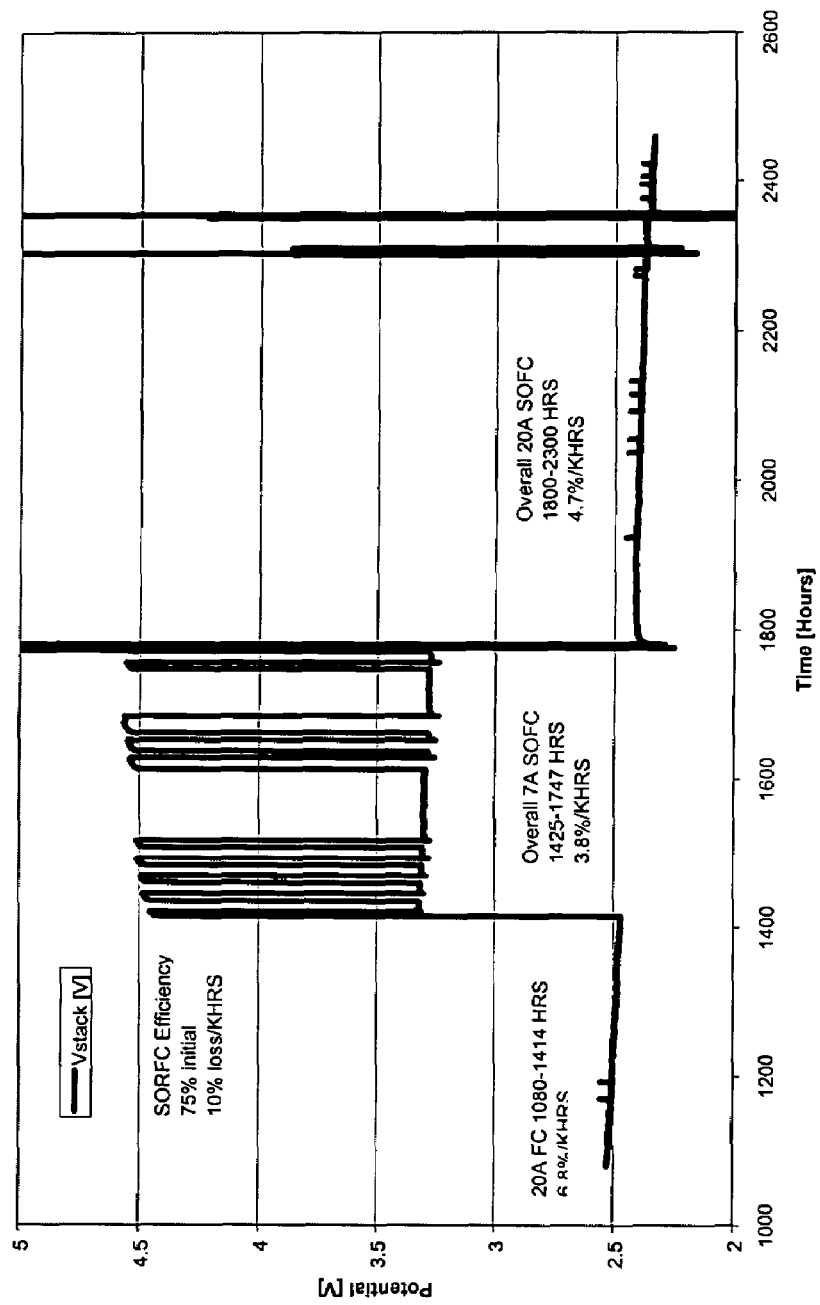

FIG. 3 illustrates an example of the second embodiment where an electrochemical reduction is conducted either at periodic intervals or on the as needed basis. In other words, the electrolysis potential is applied to the cell or stack in periodic intervals and/or when the stack voltage falls to a trigger value and/or the stack degradation rate increases to a certain trigger value.

FIG. 3 illustrates a plot of potential versus operating time for a stack containing four solid oxide fuel cells running in the fuel cell mode (i.e., electricity generating mode). The fuel cells contain an anode electrode comprising a nickel, GDC and YSZ containing cermet. The stack is initially running in the fuel cell mode at a normal operating current of about 20 amps and is degrading (i.e., the stack voltage is decreasing) at a rate of 6.8% per 1000 hours (i.e., 6.8%/khrs). This is shown on the left of FIG. 3 for the operation of the stack between 1080 and 1414 hours. Between about 1400 (specifically 1425) hours and about 1800 (specifically 1747) hours, a periodic reduction treatment is performed in the form of a reversible cycling at 100 mA/cm² (shown as spikes or peaks in FIG. 3). In other words, a periodic electrolysis mode voltage is applied to the stack as shown in FIG. 3. The degradation rate drops to approximately 3.8%. Overall, the stack runs at 7 amps in a reduced current mode during this period. The overall reversible SOFC efficiency showed a 10%/khrs loss from a 75% initial efficiency. Then, a large electrolysis voltage of 1.8V per cell is applied for 20 minutes at about 1800 hours. After this large voltage is applied, the degradation rate is approximately 4.7%/khrs for the fuel cell operating in the fuel cell mode at a normal current rate of about 20 amps from about 1800 to about 2300 hours. As illustrated in FIG. 3, using both the periodic and the "as needed" electrochemical reduction reduces the degradation rate compared to the initial degradation rate.

The present inventors do not wish to be bound by any theory or mechanism of operation of the anode reduction treatment of the second embodiment. However, a first possible, non-limiting theory or mechanism of operation includes a possibility that nickel in SOFC anode electrodes may oxidize over time, which in turn contributes to degradation of the fuel cell and the fuel cell stack. After the initial reduction of the nickel oxide to nickel at the beginning of the fuel cell stack lifetime, the anode electrode comprises a nickel containing cermet. During the operation of the fuel cell stack, a fuel stream is provided to the anode electrode. In most cases, the fuel stream contains water vapor. The presence of water can potentially lead to the oxidation of nickel due to the reversible nature of the reaction $NiO+H_2 \rightarrow Ni+H_2O$ and the extent of oxidation depends on the operating temperature and the amount of water in the anode stream. For example, Table 2 below shows thermodynamic data in which a nickel, hydrogen and steam feed is provided at 850° C. As can be seen from Table 2, the nickel to nickel oxide conversion and the nickel oxide equilibrium mole fraction increase, while the nickel equilibrium mole fraction decreases with increasing steam and decreasing hydrogen mole fractions in the feed. Thus, under the first non-limiting theory or mechanism of operation, any nickel oxide which is generated in the anode electrode and/or in the anode contact layer due to oxidation is reduced back to nickel during the reduction treatment.

TABLE 2

| Steam mole fraction in the feed | Nickel mole fraction in the feed | H mole fraction in the feed | Nickel conversion to Nickel oxide | Steam equilibrium mole fraction | H equilibrium mole fraction | Nickel equilibrium mole fraction | Nickel oxide equilibrium mole fraction |
|---|---|---|---|---|---|---|---|
| 0.03000003 | 0.3000003 | 0.66999967 | 0.00094964 | 0.0560874 | 0.37766118 | 0.56571368 | 0.00053773 |
| 0.06000006 | 0.3000003 | 0.63999964 | 0.00189484 | 0.10616568 | 0.35792864 | 0.53489022 | 0.00101545 |
| 0.09000009 | 0.3000003 | 0.60999961 | 0.00283566 | 0.15115175 | 0.34020125 | 0.50720465 | 0.00144235 |
| 0.12000012 | 0.3000003 | 0.57999958 | 0.00377213 | 0.19178503 | 0.32418787 | 0.48220129 | 0.00182581 |
| 0.15000015 | 0.3000003 | 0.54999955 | 0.0047043 | 0.22866837 | 0.30965111 | 0.45950863 | 0.00217188 |
| 0.18000018 | 0.3000003 | 0.51999952 | 0.00563223 | 0.26229822 | 0.29639552 | 0.43882072 | 0.00248554 |
| 0.21000021 | 0.3000003 | 0.48999949 | 0.00655596 | 0.29308708 | 0.28425865 | 0.41988336 | 0.0027709 |
| 0.24000024 | 0.3000003 | 0.45999946 | 0.00747553 | 0.32138056 | 0.27310443 | 0.40248356 | 0.00303144 |
| 0.27000027 | 0.3000003 | 0.42999943 | 0.00839099 | 0.34747038 | 0.262818 | 0.38644155 | 0.00327006 |
| 0.3000003 | 0.3000003 | 0.3999994 | 0.00930238 | 0.37160451 | 0.25330172 | 0.37160451 | 0.00348926 |
| 0.33000033 | 0.3000003 | 0.36999937 | 0.01020974 | 0.39399503 | 0.24447207 | 0.35784174 | 0.00369115 |
| 0.36000036 | 0.3000003 | 0.33999934 | 0.01111312 | 0.41482445 | 0.2362572 | 0.34504078 | 0.00387757 |
| 0.39000039 | 0.3000003 | 0.30999931 | 0.01201256 | 0.43425065 | 0.22859493 | 0.33310433 | 0.00405008 |
| 0.5001005 | 0.3000003 | 0.1998992 | 0.01528035 | 0.49556545 | 0.20440455 | 0.29544544 | 0.00458456 |

Another possible, non-limiting theory or mechanism of operation includes a possibility that one or more of the ceramic oxides in the anode cermet is reduced from a higher to a lower state during the reduction treatment, thus improving the performance of the fuel cell. For example, it is possible that for ceria containing anode electrodes, such as for GDC containing anode electrodes, the ceria is reduced from a 4+ to a 3+ state during the reduction treatment. Furthermore, it is also possible that one more of the contaminant oxides present in the anode electrode may also be reduce to a lower state during the reduction treatment. Another possible, non-limiting theory or mechanism of operation includes a possibility that the reduction treatment may be breaking down stable spinel structures that are forming at the interconnect/contact layer interface. It is also possible that all, some or none of the above described theories or mechanisms is responsible for the observed decrease in the fuel cell stack degradation rate after the reduction treatment.

Thus, as described above, an electrochemical reduction treatment conducted by performing electrolysis on a fuel cell or a stack by driving the current in the reverse direction to the current direction in the normal fuel cell mode can reduce the initial nickel oxide in the anode electrode faster than a chemical reduction. In addition, periodic electrochemical or chemical reduction treatments can be used to prevent or even reverse normal cell degradation during operation.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a solid oxide fuel cell, comprising:
   providing a solid oxide fuel cell comprising an anode electrode comprising nickel; and
   electrochemically reducing an anode side of the fuel cell, wherein the step of electrochemically reducing comprises:
   applying an external potential to the fuel cell; and
   providing a humidified carrier gas to the anode side of the fuel cell.

2. The method of claim 1, wherein the fuel cell comprises a non-reversible solid oxide fuel cell.

3. The method of claim 2, wherein the anode electrode comprises a cermet comprising the nickel and ceria.

4. The method of claim 3, wherein:
   the ceria in the anode electrode cermet comprises gadolinia doped ceria;
   the anode electrode cermet further comprises doped zirconia; and
   the solid oxide fuel cell further comprises an ionically conductive ceramic electrolyte and an electrically conductive cathode electrode.

5. The method of claim 1, wherein the step of electrochemically reducing is conducted prior to electricity generation operation of the fuel cell.

6. The method of claim 5, wherein:
   at least a portion of the nickel in the anode electrode is in a form of nickel oxide prior to the step of electrochemically reducing; and
   at least a portion of the nickel oxide is reduced to nickel during the step of electrochemically reducing.

7. The method of claim 1, wherein the step of electrochemically reducing is conducted on at least one of the anode electrode and an anode contact layer between electricity generation operation periods of the fuel cell.

8. The method of claim 7, wherein the step of electrochemically reducing is conducted a plurality of times at predetermined periodic intervals.

9. The method of claim 7, further comprising detecting at least one of when a voltage generated by a fuel cell stack containing the solid oxide fuel cell drops below a first predetermined voltage or when the fuel cell stack degradation rate reaches a second predetermined value.

10. The method of claim 9, wherein the step of electrochemically reducing is conducted after the at least one of when the voltage generated by the fuel cell stack containing the solid oxide fuel cell drops below the first predetermined voltage or when the fuel cell stack degradation rate reaches the second predetermined value.

11. The method of claim 1, wherein:
    the external potential causes oxygen ions from nickel oxide present in the anode electrode to diffuse through an electrolyte of the fuel cell to a cathode electrode of the fuel cell to reduce the nickel oxide to nickel; and
    water in the humidified carrier gas is preferentially reduced compared to a doped zirconia present in the anode electrode to at least partially protect the doped zirconia from being reduced during the step of electrochemically reducing.

12. The method of claim 1, wherein the humidified carrier gas comprises at least one of a humidified argon, hydrogen or nitrogen carrier gas.

13. The method of claim 1, further comprising providing an oxygen containing gas to the cathode electrode of the fuel cell.

14. A method of operating a solid oxide fuel cell, comprising:
    providing a solid oxide fuel cell comprising an anode electrode comprising nickel;
    periodically operating the fuel cell to generate electricity; and
    reducing an anode side of the fuel cell between electricity generation operation periods of the fuel cell, wherein the step of reducing is conducted a plurality of times at predetermined periodic intervals.

15. The method of claim 14, wherein the fuel cell comprises a non-reversible solid oxide fuel cell.

16. The method of claim 14, further comprising detecting at least one of when a voltage generated by a fuel cell stack containing the solid oxide fuel cell drops below a first predetermined voltage or when the fuel cell stack degradation rate reaches a second predetermined value, wherein the step of reducing is conducted after the at least one of when the voltage generated by the fuel cell stack containing the solid oxide fuel cell drops below the first predetermined voltage or when the fuel cell stack degradation rate reaches the second predetermined value.

17. The method of claim 14, wherein the anode electrode comprises a cermet comprising the nickel and ceria.

18. The method of claim 17, wherein:
    the ceria in the anode electrode cermet comprises gadolinia doped ceria;
    the anode electrode cermet further comprises doped zirconia; and
    the solid oxide fuel cell further comprises an ionically conductive ceramic electrolyte and an electrically conductive cathode electrode.

19. The method of claim 14, wherein the step of reducing the anode side of the fuel cell comprises electrochemically reducing at least one of the anode electrode and a nickel containing anode contact layer.

20. The method of claim 14, wherein the step of reducing the anode side of the fuel cell comprises providing hydrogen or a hydrogen containing gas to the anode side of the fuel cell to reduce at least one of the anode electrode and a nickel containing anode contact layer.

21. A method of operating a solid oxide fuel cell, comprising:
- providing a solid oxide fuel cell comprising an anode electrode comprising nickel oxide;
- electrochemically reducing the nickel oxide in the anode electrode to nickel prior to electricity generation operation of the fuel cell; and
- after the step of electrochemically reducing the nickel oxide, periodically operating the fuel cell to generate electricity; and
- further reducing the anode electrode between electricity generation operation periods of the fuel cell.

22. The method of claim 21, wherein the fuel cell comprises a non-reversible solid oxide fuel cell.

23. The method of claim 22, wherein:
- at least a portion of nickel in the anode electrode is in a form of the nickel oxide prior to the step of electrochemically reducing;
- at least a portion of the nickel oxide is reduced to nickel during the step of electrochemically reducing; and
- the anode electrode comprises a cermet comprising the nickel and ceria after the step of electrochemically reducing.

24. The method of claim 23, wherein:
- the ceria in the anode electrode cermet comprises gadolinia doped ceria;
- the anode electrode cermet further comprises doped zirconia; and
- the solid oxide fuel cell further comprises an ionically conductive ceramic electrolyte and an electrically conductive cathode electrode.

25. A method of operating a solid oxide fuel cell, comprising:
- providing a solid oxide fuel cell comprising an anode electrode comprising nickel; and
- electrochemically reducing an anode side of the fuel cell, wherein:
  - the step of electrochemically reducing is conducted on at least one of the anode electrode and an anode contact layer between electricity generation operation periods of the fuel cell; and
  - the step of electrochemically reducing is conducted a plurality of times at predetermined periodic intervals.

26. The method of claim 25, wherein the fuel cell comprises a non-reversible solid oxide fuel cell.

27. A method of operating a solid oxide fuel cell, comprising:
- providing a solid oxide fuel cell comprising an anode electrode comprising nickel;
- detecting at least one of when a voltage generated by a fuel cell stack containing the solid oxide fuel cell drops below a first predetermined voltage or when the fuel cell stack degradation rate reaches a second predetermined value; and
- electrochemically reducing an anode side of the fuel cell, wherein the step of electrochemically reducing is conducted on at least one of the anode electrode and an anode contact layer between electricity generation operation periods of the fuel cell.

28. The method of claim 27, wherein:
- the step of detecting comprises detecting when the voltage generated by the fuel cell stack containing the solid oxide fuel cell drops below the first predetermined voltage; and
- the step of electrochemically reducing is conducted after when the voltage generated by the fuel cell stack containing the solid oxide fuel cell drops below the first predetermined voltage.

29. The method of claim 27, wherein:
- the step of detecting comprises detecting when the fuel cell stack degradation rate reaches the second predetermined value; and
- the step of electrochemically reducing is conducted after when the fuel cell stack degradation rate reaches the second predetermined value.

30. The method of claim 27, wherein the fuel cell comprises a non-reversible solid oxide fuel cell.

31. A method of operating a solid oxide fuel cell, comprising:
- providing a solid oxide fuel cell comprising an anode electrode comprising nickel;
- periodically operating the fuel cell to generate electricity;
- reducing an anode side of the fuel cell between electricity generation operation periods of the fuel cell; and
- detecting at least one of when a voltage generated by a fuel cell stack containing the solid oxide fuel cell drops below a first predetermined voltage or when the fuel cell stack degradation rate reaches a second predetermined value, wherein the step of reducing is conducted after the at least one of when the voltage generated by the fuel cell stack containing the solid oxide fuel cell drops below the first predetermined voltage or when the fuel cell stack degradation rate reaches the second predetermined value.

32. The method of claim 31, wherein:
- the step of detecting comprises detecting when the voltage generated by the fuel cell stack containing the solid oxide fuel cell drops below the first predetermined voltage; and
- the step of reducing is conducted after when the voltage generated by the fuel cell stack containing the solid oxide fuel cell drops below the first predetermined voltage.

33. The method of claim 31, wherein:
- the step of detecting comprises detecting when the fuel cell stack degradation rate reaches the second predetermined value; and
- the step of reducing is conducted after when the fuel cell stack degradation rate reaches the second predetermined value.

34. The method of claim 31, wherein the fuel cell comprises a non-reversible solid oxide fuel cell.

* * * * *